United States Patent
Liu et al.

(10) Patent No.: US 10,921,693 B2
(45) Date of Patent: Feb. 16, 2021

(54) FOCAL LENGTH CALIBRATION METHOD AND PROJECTION DEVICE

(71) Applicant: Coretronic Corporation, Hsin-Chu (TW)

(72) Inventors: Jui-Ta Liu, Hsin-Chu (TW); Chih-Hsiang Li, Hsin-Chu (TW); Yu-Chun Chen, Hsin-Chu (TW); I-Ming Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 74 days.

(21) Appl. No.: 16/396,760

(22) Filed: Apr. 28, 2019

(65) Prior Publication Data
US 2020/0310230 A1     Oct. 1, 2020

(30) Foreign Application Priority Data

Apr. 1, 2019 (TW) .............................. 108111461 A (51) Int. Cl.
*G03B 21/14* (2006.01)
*H04N 9/31* (2006.01)
*G06F 3/0484* (2013.01)

(52) U.S. Cl.
CPC ....... *G03B 21/142* (2013.01); *G06F 3/04847* (2013.01); *H04N 9/315* (2013.01)

(58) Field of Classification Search
CPC ..... G03B 21/00–64; H04N 9/31–3197; H04N 5/00–956; G06F 3/00–167
See application file for complete search history.

(56) References Cited

U.S. PATENT DOCUMENTS

| 2005/0062939 | A1* | 3/2005 | Tamura | G03B 21/145 353/69 |
| 2009/0027571 | A1* | 1/2009 | Amano | H04N 9/3194 348/744 |
| 2010/0259767 | A1* | 10/2010 | Takeuchi | H04N 9/3147 356/614 |

(Continued)

FOREIGN PATENT DOCUMENTS

| CN | 1873525 | 12/2006 |
| CN | 101470248 | 10/2011 |

(Continued)

OTHER PUBLICATIONS

"Office Action of Taiwan Counterpart Application," dated Jan. 6, 2020, p. 1-p. 11.

*Primary Examiner* — Christina A Riddle
*Assistant Examiner* — Christopher A Lamb, II
(74) *Attorney, Agent, or Firm* — JCIPRNET (57) ABSTRACT

The disclosure provides a method and a projection device for focal length calibration. The projection device includes a distance sensor, a projection lens, and a controller. The method includes: defining, by the distance sensor, a detection area on a projection surface; dividing, by the controller, the detection area into a plurality of reference areas; detecting, by the distance sensor, a reference distance between the projection device and each reference area; finding, by the controller, at least one first area and at least one second area in the reference areas; and performing, by the controller, a focusing operation of the projection lens only based on the reference distance of each second area.

20 Claims, 5 Drawing Sheets

(56) References Cited

U.S. PATENT DOCUMENTS

| | | | | |
|---|---|---|---|---|
| 2011/0242332 A1* | 10/2011 | McFadyen | ............ | H04N 9/3194 |
| | | | | 348/189 |
| 2015/0070662 A1 | 3/2015 | Nishima et al. | | |
| 2015/0237318 A1* | 8/2015 | Nakashin | ............. | H04N 9/3194 |
| | | | | 348/745 |
| 2016/0080709 A1* | 3/2016 | Viswanathan | ....... | H04N 9/3155 |
| | | | | 353/85 |

FOREIGN PATENT DOCUMENTS

| | | |
|---|---|---|
| CN | 108696680 | 10/2018 |
| TW | 200823589 | 6/2008 |
| TW | 201133119 | 10/2011 |
| TW | 201830049 | 8/2018 |

* cited by examiner

FOCAL LENGTH CALIBRATION METHOD AND PROJECTION DEVICE

CROSS-REFERENCE TO RELATED APPLICATION

This application claims the priority benefit of Taiwan application serial no. 108111461, filed on Apr. 1, 2019. The entirety of the above-mentioned patent application is hereby incorporated by reference herein and made a part of this specification.

BACKGROUND OF THE DISCLOSURE

Field of the Disclosure

The disclosure relates to a calibration technique for a projection device, and more particularly, to a focal length calibration method and a projection device.

Description of Related Art

In the design of projectors, the most used autofocus techniques roughly include: (1) infrared (IR) autofocus; (2) laser autofocus; (3) ultrasonic autofocus; and (4) projection lens auto focus.

In the infrared/laser autofocus techniques, a light source on the projector actively emits an infrared signal to a projection surface, and a receiver on the projector receives the reflected infrared signal. The projector then calculates the focal length of the projector based on the geometric relationship between the light source, the projection surface, and the receiver. However, since the external signal is susceptible to the influence of external ambient light, the result of focus misalignment readily occurs. Moreover, the infrared focusing technique is also limited in practical applications because of its unidirectionality.

In the ultrasonic autofocus technique, the projector may send an ultrasonic signal that cannot be heard by the human ear to the projection surface via an ultrasonic transmitter and receive the ultrasonic signal reflected by the projection surface via an ultrasonic receiving device on the projector. Thereafter, the projector may calculate the focal length based on the round-trip time of the ultrasonic signal. However, when there is an obstacle between the projector and the projection surface, the projector may not be able to accurately calculate the focal length. Moreover, when the distance between the projector and the projection surface is greater, the size of the ultrasonic transmitting/receiving device is also increased, which limits the mechanical design and use space. Moreover, the directivity and the angle of the reflective surface should also be considered in terms of use.

In the projection lens autofocus technique, the projector may capture an image projected by the projector to the projection surface via a projection lens and compare and calculate the captured image via a system-on-chip (SoC). The SoC may then control a driver circuit accordingly to move/correct the projection lens to the focus position. The above process is repeatedly performed until the projector determines that the projection lens is moved to the optimal focus position. However, since the projection lens autofocus technique needs to capture the entire projection image or compare for edge sampling, the required amount of data is large, which increases the focus time and affects system performance. Moreover, the complexity of the processing performed by the firmware for the entire projection image captured is also higher. In addition, due to the need to continuously capture the projection image, issues such as slower reaction and vulnerability to environmental light sources may occur.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

Accordingly, the disclosure provides a focal length calibration method and a projection device, which may be used to solve the above technical issues.

The disclosure provides a focal length calibration method adapted for a projection device. The projection device includes a distance sensor, a projection lens, and a controller. The method includes the following steps. A detection area is defined on a projection surface by the distance sensor. The detection area is divided into a plurality of reference areas by the controller. A reference distance is detected between the projection device and each reference area by the distance sensor. At least one first area and at least one second area are found in the reference areas by the controller. A focusing operation of the projection lens is performed by the controller only based on the reference distance of each second area.

The disclosure provides a projection device, including a projection lens, a distance sensor, and a controller. The projection lens projects a projection image to a projection surface. The distance sensor defines a detection area on the projection surface. The controller is coupled to the projection lens and the distance sensor, and configured to: divide the detection area into a plurality of reference areas; control the distance sensor to detect a reference distance between the projection device and each reference area; find at least one first area and at least one second area in the reference area; and perform a focusing operation of the projection device only based on the reference distance of each second area.

Based on the above, the focal length calibration method of the disclosure allows the projection device to perform the focusing operation only based on some of the reference areas (i.e., the second areas), without performing the focusing operation of the projection device based on all of the reference areas. In addition to reducing the influence of environmental factors (such as ambient light, reflective surface, etc.) on the focusing operation of the projection device, terrain environment or artificial temporary interference may be eliminated, which may effectively improve the efficiency of the focusing operation and reduce the limitations in mechanical design.

In order to make the aforementioned features and advantages of the disclosure more comprehensible, embodiments accompanied with figures are described in detail below.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
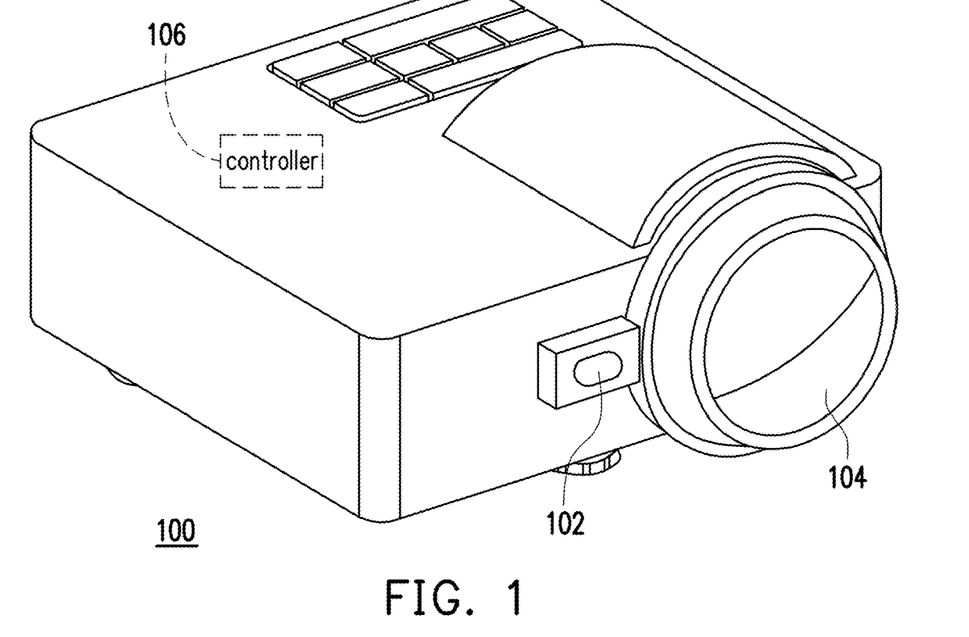
FIG. 1 is a schematic view of a projection device illustrated according to an embodiment of the disclosure.

FIG. 1 is a schematic view of a projection device illustrated according to an embodiment of the disclosure. In FIG. 1, a projection device 100 includes a distance sensor 102, a projection lens 104, and a controller 106. In the present embodiment, the projection device 100 has a light source module (not shown) that may provide a projection light corresponding to a specific image. In the present embodiment, the projection device 100 may include at least a light source module, a light valve, and the projection lens 104, wherein the light source module may be a plurality of solid-state light-emitting sources such as light-emitting diodes or laser diodes, and the light source module may also be a high-intensity discharge lamp. The light source module is configured to generate a light beam, and the light valve (not shown) is configured to convert the light beam into an image beam. The light valve is, for example, a reflective or transmissive spatial light modulator. The spatial light modulator may be a digital micro-mirror device (DMD) or a liquid-crystal-on-silicon panel (LCOS panel). The transmissive spatial light modulator is, for example, a transmissive liquid crystal display panel (LCD panel). The image beam is projected via the projection lens 104 to a projection surface (e.g., a curtain, a wall, etc.) to form a projection image on the projection surface. The distance sensor 102 is, for example, a device that may measure distance such as a laser ranging unit, an infrared ranging unit, etc., which may be configured to define a detection area on the projection surface. The detection area is, for example, a specific area in which the distance sensor 102 may perform a distance detecting operation, and the size of the specific area may be determined by the designer according to requirements.

In an embodiment of the disclosure, the distance sensor 102 may be configured to perform a distance detection to a certain location/area in the detection area. For example, for a certain area in the detection area, the distance sensor 102 may simultaneously send a plurality of detection signals to a plurality of reference points on the certain area to detect the distance between the distance sensor 102 and each reference point. Thereafter, the distance sensor 102 may provide the measured distances to the controller 106, and the controller 106 may calculate an average value of the distances and take this average value as the distance between the projection device 100 and the certain area. In addition, the distance sensor 102 may also perform distance detection on a plurality of areas in the detection area based on the above mechanism to calculate the distance between the projection device 100 and each area.

In various embodiments, the distance sensor 102 may define a detection area on the projection surface with or without a projection image on the projection surface. Moreover, in an embodiment, if a projection image already exists on the projection surface, then the projection image may be at least partially included in the detection area defined by the distance sensor 102, but the disclosure may not be limited thereto.

In addition, in FIG. 1, the controller 106 may be coupled to the distance sensor 102 and the projection lens 104, and may be a general-purpose processor, a special-purpose processor, a conventional processor, a digital signal processor, a plurality of microprocessors, one or a plurality of microprocessors, controllers, microcontrollers, application-specific integrated circuits (ASICs), or field-programmable gate array (FPGA) circuits combined with a digital signal processor core, any other types of integrated circuits, state machines, advanced RISC machine (ARM)-based processors, and the like.

Figure 2:
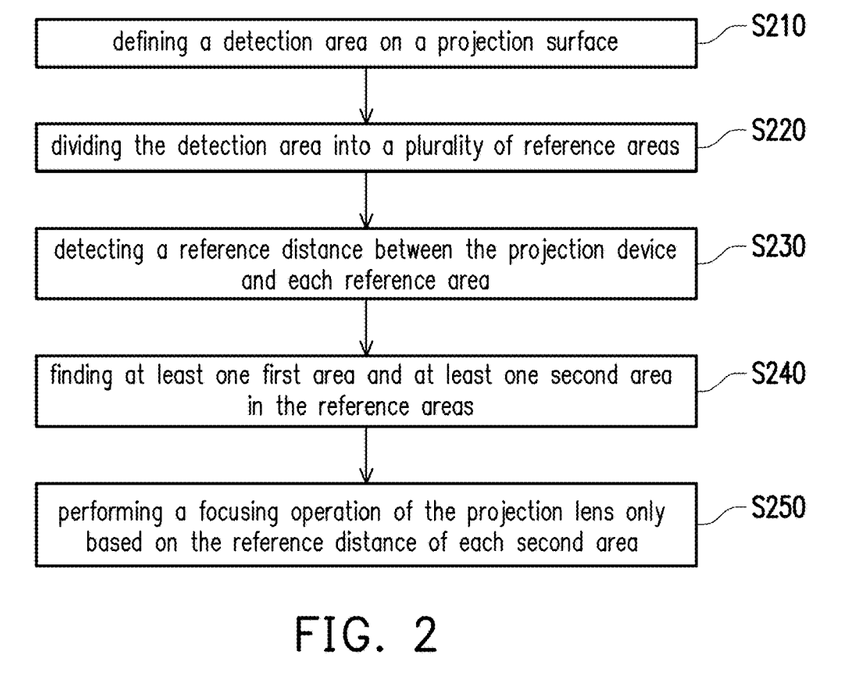
FIG. 2 is a focal length calibration method illustrated according to an embodiment of the disclosure.

FIG. 2 is a focal length calibration method shown according to an embodiment of the disclosure. The method of the present embodiment may be performed by the projection device 100 of FIG. 1. The details of each step of FIG. 2 would be described below with reference to the elements shown in FIG. 1.

Firstly, in step S210, the distance sensor 102 may define a detection area on a projection surface, and the detection area may be the largest or most accurate range detectable by the distance sensor 102. Next, in step S220, the controller 106 may divide the detection area into a plurality of reference areas. In order to make the concepts of steps S210 and S220 clearer, the following description is supplemented with FIG. 3.

Figure 3:
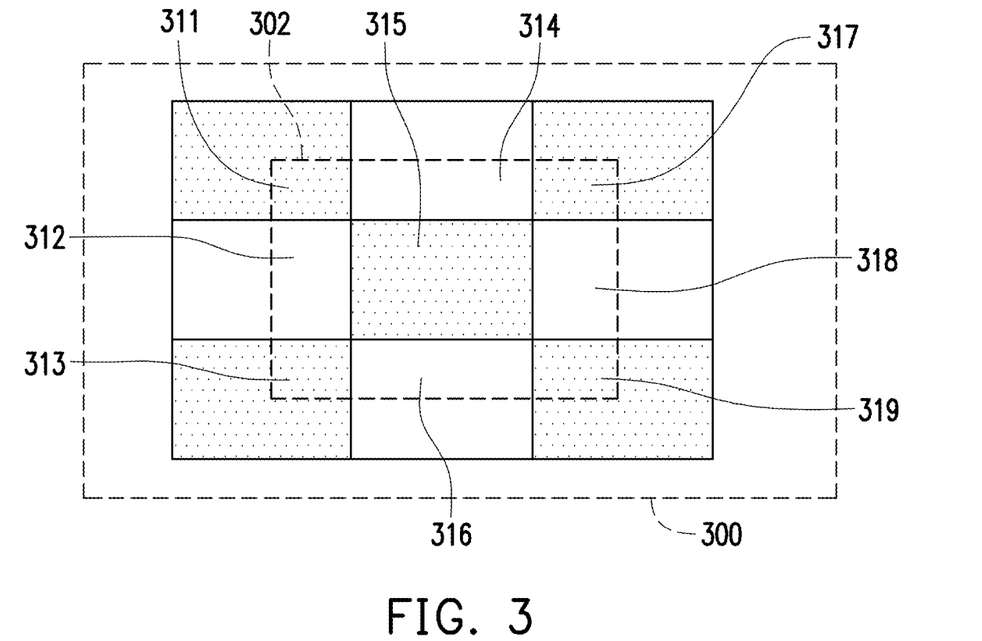
FIG. 3 is a schematic view of a detection area and a plurality of reference areas illustrated according to an embodiment of the disclosure.

FIG. 3 is a schematic view of a detection area and a plurality of reference areas illustrated according to an embodiment of the disclosure. In FIG. 3, the distance sensor 102 may project a projection image 300 on a projection surface (for example, a wall surface), the distance sensor 102 defines a detection area, and the controller 106 may accordingly divide the detection area into reference areas 311, 312, 313, 314, 315, 316, 317, 318, and 319, and the reference area 315 therein may correspond to the center of the projection image. It should be understood that although nine reference areas 311 to 319 having a specific size/shape are illustrated in FIG. 3, they are merely exemplary and are not intended to limit the implementation of the disclosure.

In other embodiments, the designer may also adjust the number/shape/size/relative position of the reference areas defined by the controller 106 in the detection area according to requirements, and the detection area may be further divided into 16, 36, etc. reference areas, and each reference area may have different size/shape. For example, the central detection area 315 near the center of the detection area may have a larger area. In addition, the distance between the projector and the projection surface causes the projection images 300 and 302 to have different sizes. When the distance between the projector and the projection surface is greater, the projection image 300 may be greater than the detection area, or when the distance between the projector and the projection surface is smaller, the projection image 302 may be smaller than the detection area. Therefore, when a designer designs the projection device 100, the center of the projection image does not necessarily need to completely correspond to the central reference area 315, but may be adjusted to other states. For example, the center of the projection image may also simultaneously correspond to (including) a plurality of reference areas, but the disclosure is not limited thereto.

Referring to FIG. 2 again, in step S230, the controller 106 may control the distance sensor 102 to detect the reference distance between the projection device 100 and each of the reference areas 311 to 319. In the present embodiment, the distance sensor 102 may be controlled to detect the reference distance between the reference areas 311 to 319 according to the distance detection method taught in the previous embodiments. Taking the reference area 311 as an example, the distance sensor 102 may simultaneously transmit a plurality of detection signals to a plurality of reference points on the reference area 311 to detect the distance between the distance sensor 102 and the reference points. Thereafter, the controller 102 may calculate an average value of the distances as a reference distance between the projection device 100 and the reference area 311. Based on the same mechanism, the controller 106 may simultaneously obtain the reference distance between the projection device 100 and each of the reference areas 312 to 319. In other embodiments, the reference distance between the projection device 100 and each of the reference areas 311 to 319 may also be calculated based on other ways, and the disclosure is not limited to the mechanism taught above. For example, the reference distance may also be the calculation result of a geometric mean, a mode, and the like.

Thereafter, in step S240, the controller 106 may find at least one first area and at least one second area in the reference areas 311 to 319. Next, in step S250, the controller 106 may perform a focusing operation of the projection lens 104 only based on the reference distance of each second area.

As can be understood based on the above, the controller 106 of the disclosure may perform the focusing operation of the projection device 100 based on only some of the reference areas 311 to 319 (i.e., the second area), and does not perform the focusing operation of the projection device 100 based on all of the reference areas. In other words, when the controller 106 performs the focusing operation, it is performed under the situation of excluding first area.

In an embodiment, the first area above be automatically determined by the controller 106. For example, when the majority of the reference distances is significantly greater than at least one of the reference distances, the controller 106 may add at least one of the reference areas corresponding to the at least one reference distance to at least one first area. In short, the controller 106 may define one or a plurality of the reference areas 311 to 319 that are obviously too close to the projection device 100 (i.e., the reference distance is too short) as the first area that is not considered in the focusing operation.

In detail, when there are certain obstacles (such as users, cups, etc.) between the projection device 100 and the detection area, some of the reference distances obtained by the controller 106 may be made to be significantly smaller than the other reference distances. For ease of explanation, it is assumed in the following discussions that the reference distances between the reference areas 311 to 313 and the projection device 100 is significantly smaller than the reference distances between the other reference areas 314 to 319 and the projection device 100, but the implementation of the disclosure is not limited thereto. In this case, there may be a certain obstacle between the projection device 100 and the reference areas 311 to 313. In order to prevent this obstacle from affecting the focusing operation of the projection device 100 subsequently performed, the controller 106 may define the reference areas 311 to 313 as the first area, which are not considered in the subsequent focusing operation. Accordingly, the controller 106 may define the other reference areas 314 to 319 that are not defined as the first area but as the second area, and perform the subsequent focusing operation only based on the second area (i.e., the reference areas 314 to 319).

In other embodiments, the first area may also be manually determined by the user. For example, the controller 106 may control the projection lens 104 to also display each of the reference areas 311 to 319 on the projection image 300, and the user may select one or a plurality of the reference areas 311 to 319 as the first area via a remote controller or other related user input devices, that is, the selected reference area is used as the first area. Thereafter, the controller 106 may define other reference areas (the unselected reference areas) that are not selected by the user as the second area, and perform the subsequent focusing operation only based on the second area.

It may be understood from the above that the focal length calibration method and the projection device provided by the disclosure may not only perform multi-point distance detection, but may also perform a subsequent focusing operation only based on some of the reference areas (i.e., the second area) by excluding some of the reference areas (i.e., the first area). In addition to reducing the influence of environmental factors (such as ambient light, reflective surface, etc.) on the focusing operation of the projection device, the efficiency of the focusing operation may be improved and limitations on mechanical design may be reduced.

Figure 4:
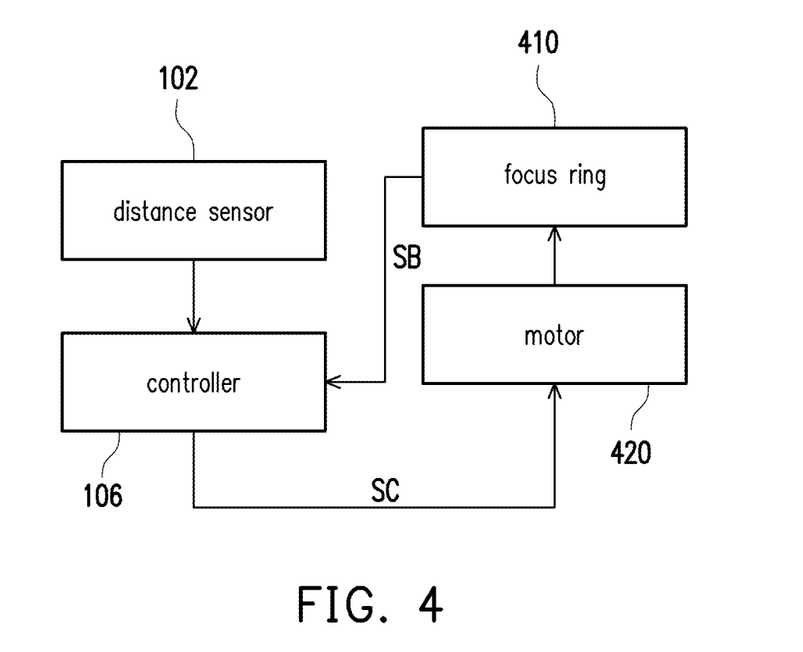
FIG. 4 is a schematic view of a focusing operation illustrated according to an embodiment of the disclosure.

FIG. 4 is a schematic view of a focusing operation illustrated according to an embodiment of the disclosure. As shown in FIG. 4, the projection device 100 further includes a focus ring 410 and a motor 420, wherein the motor 420 may be coupled to the focus ring 410 and configured to drive the focus ring 410 to adjust the focal length of the projection device 100.

In the present embodiment, the controller 106 may first obtain an location point of the motor 420 (which corresponds to the current position of the focus ring 410), and then control the motor 420 based on the reference distance between the distance sensor 102 and each second area to drive the focus ring 410 to adjust the focal length of the projection device 100. Specifically, the controller 106 may generate a corresponding control signal SC based on the reference distance between each second area and the location point and control the motor 420 to drive the focus ring 410 to adjust the focal length via the control signal SC. Thereafter, the controller 106 may obtain a feedback signal SB corresponding to the current focal length from the focus ring 410 and determine whether the focal length of the projection device 100 is adjusted to the target state. If so, the controller 106 may determine that the focusing operation of the projection device 100 is completed, and conversely, the above operations may be repeatedly performed until the focal length of the projection device 100 is adjusted to the target state.

Figure 5:
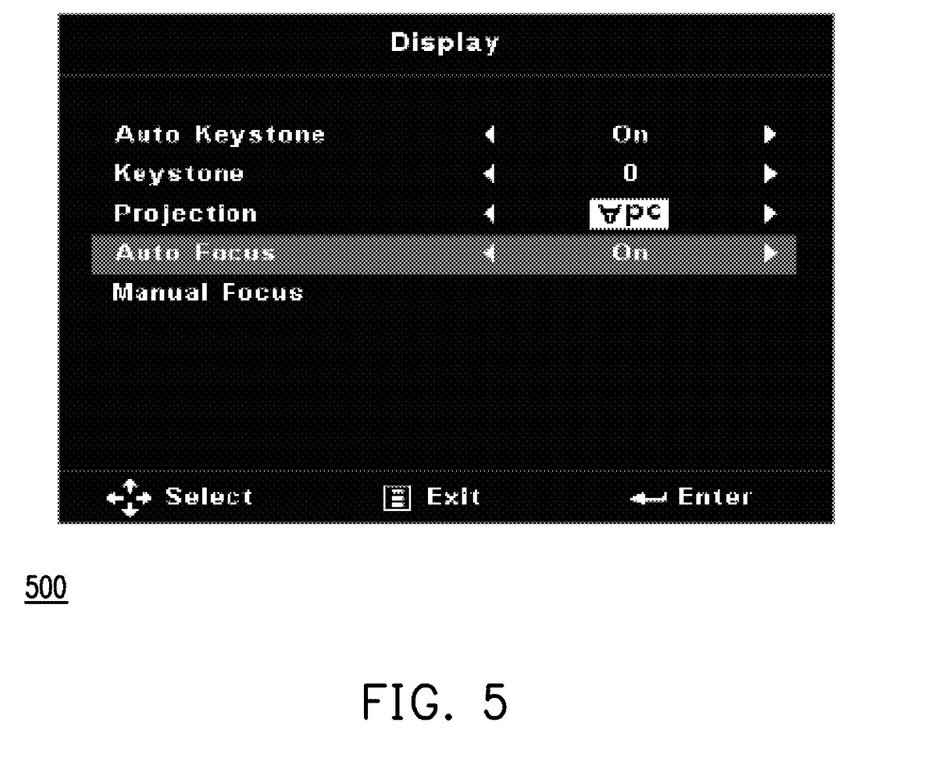
FIG. 5 is a schematic view of an on-screen display illustrated according to an embodiment of the disclosure.

FIG. 5 is a schematic view of an on-screen display illustrated according to an embodiment of the disclosure. In the present embodiment, the user may control the projection device 100 to display an on-screen display (OSD) 500 shown in FIG. 5 in the projection image by pressing a relevant function key on the projection device 100 or using various wired, wireless, or remote input devices. Thereafter, the user may enable the autofocus function shown in the on-screen display OSD 500, so that the projection device 100 performs the focusing operation based on only the found second area according to the method taught in the above embodiments, but the disclosure is not limited thereto.

Figure 6A:
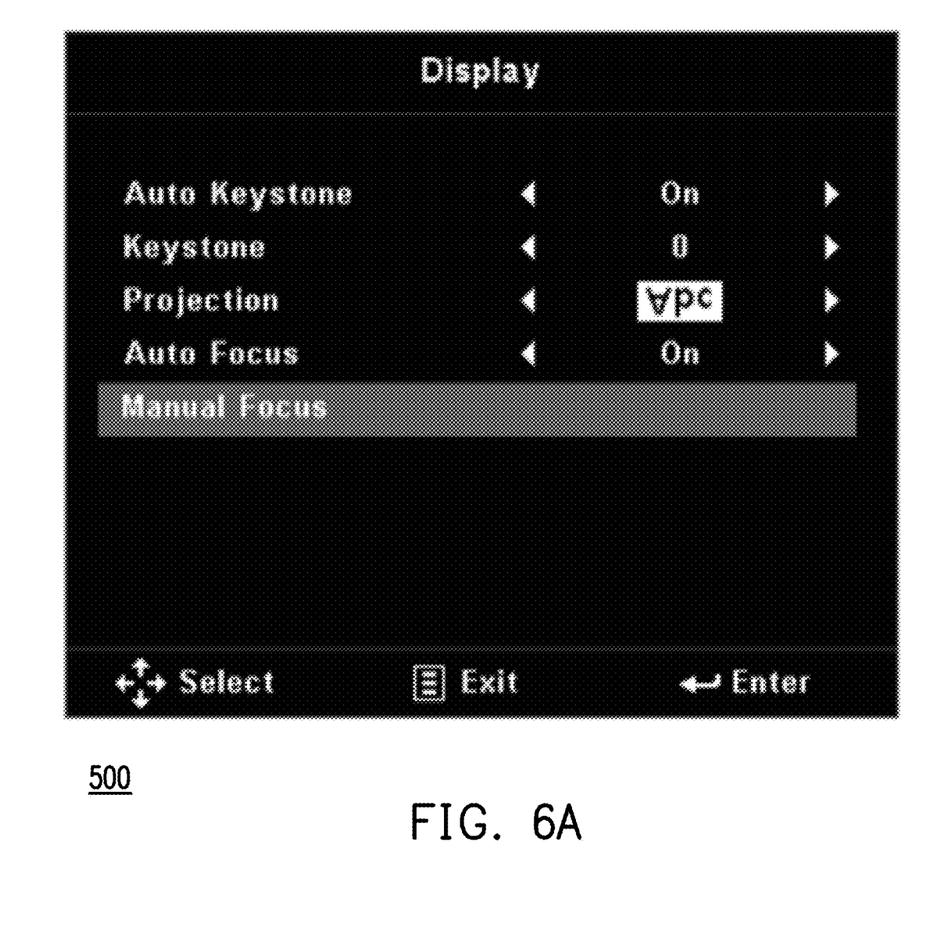
FIG. 6A is a schematic view of an on-screen display illustrated according to FIG. 5.
Figure 6B:
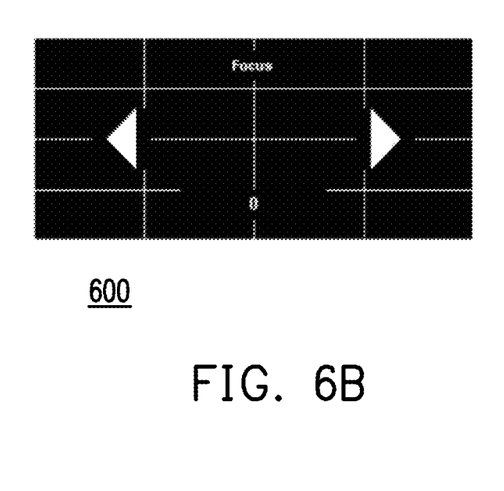
FIG. 6B is schematic view of the on-screen display OSD illustrated according to FIG. 6A performing focus adjustment.

Referring to FIG. 6A and FIG. 6B, FIG. 6A is a schematic view of the on-screen display shown according to FIG. 5, and FIG. 6B is a schematic view of the on-screen display (OSD) shown according to FIG. 6A configured to perform a focus adjustment. In the present embodiment, if the user believes that the projection image of the projection device 100 is not clear enough due to factors such as being out of focus, etc., the user may again press a related function key on the projection device 100 or other wired, wireless, or remote input devices and the like to control the projection device 100 to display the OSD 500 in the projection image, and then control the projection device 100 to adjust the focal length by enabling the manual focus function therein. For example, if the input device is a button located on the projection device 100 or a virtual button displayed on a mobile phone of the user, the user may hold down for a while the button to make the projection device 100 enter the manual focus function to control the projection device 100 to adjust the focal length. After the manual focus function is activated, the projection lens 104 of the projection device 100 may project an OSD 600 shown in FIG. 6B in the projection image, and the user may adjust the OSD 600 to move the focus position to be focused in the projection image via a user input device such as the remote control of the projection device 100. After the user adjusts the focus position to a selected position, the projection device 100 may perform a focusing operation based on the selected position to adjust the focal length of the projection device 100.

In the present embodiment, in order to prevent an object located near the focus ring from affecting the focusing operation and causing the motor to be damaged, the controller 106 of the projection device 100 may determine whether there is an object that is less than a preset distance (for example, 3 centimeter) therebetween the projection device 100 in the vicinity of the projection device 100 before obtaining the location point of the focus ring. In an embodiment, the controller 106 may perform the above determination based on a reference distance between each of the reference areas 311 to 319. In this case, if the controller 106 determines that at least one reference distance is less than the preset distance, the controller 106 may stop controlling the motor from driving the focus ring to adjust the focal length of the projection device. In an embodiment, the controller 106 may implement the above means by disconnecting the power of the motor and skipping the location point, etc., but the disclosure is not limited thereto. In short, if there is an object that is too close to the projection device 100, the projection device 100 may pause the focusing operation.

Thereafter, when the controller 106 determines that the reference distances between the reference areas 311 and 319 are all greater than the preset distance (i.e., the object has disappeared), the focusing operation may be continued.

In an embodiment, when the projection device 100 is out of focus and the projection image is unclear, the projection device 100 of the disclosure further provides the following mechanism, so that the user may trigger the projection device 100 to perform the focusing operation again.

In the present embodiment, when the controller 106 determines that at least one reference distance is less than the preset distance and continues for a preset time (for example, 1 second), the controller 106 may stop controlling the motor from driving the focus ring to adjust the focal length of the projection device 100, and when the controller 106 determines that the reference distance is greater than the preset distance (e.g., the obstacle is removed from the front), the controller 106 may begin to control the motor to drive the focus ring to adjust the focal length of the projection device 100 and perform the focusing operation again. In this way, when the user wants to trigger the projection device 100 to perform the focusing operation, an object may be placed before the distance sensor 102 for the preset time. Thereafter, the controller 106 may perform the focusing operation again accordingly to adjust the focal length of the projection device 100.

Figure 7:
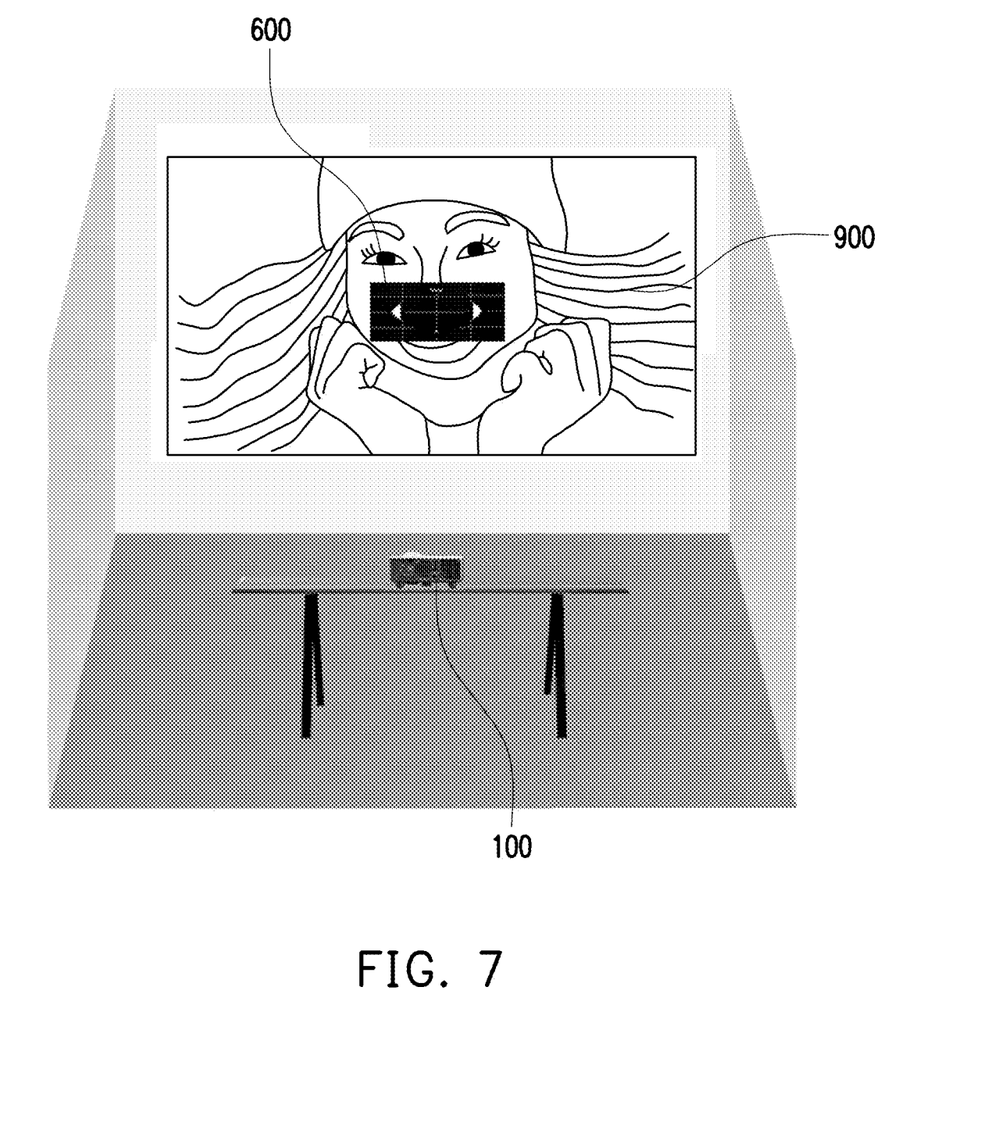
FIG. 7 is a schematic view of displaying an on-screen display illustrated according to an embodiment of the disclosure.

FIG. 7 is a schematic view of displaying an on-screen display illustrated according to an embodiment of the disclosure. In the present embodiment, after the projection lens 104 of the projection device 100 projects a projection image 900 to the projection surface, the controller 106 may obtain the reference distance between each reference area according to the teachings of the previous embodiments. Thereafter, the controller 106 may determine whether each of the reference distances is greater than a maximum projection distance (e.g., 2 meters) of the projection device 100 or the maximum measurement range of the distance sensor 102. If so, the controller 106 may control the projection lens 104 to display a prompt message indicating the distance is too large in the projection image 900. In FIG. 9, the controller 106 may also control the projection lens 104 to project the OSD 600, such that the user may be allowed to adjust the OSD 600 to move the focus position in the projection image 900 via a user input device such as the remote control of the projection device 100 to perform focusing.

In another embodiment, if the user makes each of the detected reference distances smaller than the maximum projection distance or the maximum measurement range of the distance sensor 102 by moving the projection device 100 or the like, the controller 106 may control the projection lens 104 to stop displaying the OSD 600 after detecting the above situation, but the disclosure is not limited thereto.

Based on the above, the focal length calibration method and the projection device provided by the disclosure may detect the reference distance from each of the reference areas in the detection area by means of multi-point distance detection, and may perform the subsequent focusing operation only based on some of the reference areas (i.e., the second area) while excluding certain reference areas (i.e., the first area). In various embodiments, the first area may be determined by the projection device itself or manually determined by the user. In addition to reducing the influence of environmental factors (such as ambient light, reflective surface, etc.) on the focusing operation of the projection device, the efficiency of the focusing operation may be improved and limitations on mechanical design may be reduced.

Moreover, in order to avoid an error in the focusing operation, in the disclosure, whether there is an object too close to the projection device may be determined before the focusing operation is performed. If so, the projection device may pause the focusing operation and perform the focusing operation again after determining that the object has disappeared. In addition, when the projection device is out of focus such that the projection image is unclear, the disclosure provides a mechanism for the user to manually trigger the projection device to perform the focusing operation. Furthermore, when the distance between the projection device and the projection surface exceeds the maximum projection distance of the projection device or the maximum measurement range of the distance sensor, the projection device may also prompt the user to perform an operation such as manual focus or moving the projection device via a prompt message.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A focal length calibration method adapted for a projection device, wherein the projection device comprises a distance sensor, a projection lens, and a controller, and the method comprises:
   defining, by the distance sensor, a detection area on a projection surface;
   dividing, by the controller, the detection area into a plurality of reference areas;
   detecting, by the distance sensor, a reference distance between the projection device and each of the reference areas;
   finding, by the controller, at least one first area and at least one second area in the reference areas, wherein the reference distance of the at least one second area is greater than the reference distance of the at least one first area; and
   performing, by the controller, a focusing operation of the projection lens only based on the reference distance of each of the at least one second areas.

2. The focal length calibration method of claim 1, wherein:
   detecting, by the distance sensor, a plurality of distances between the projection device and a plurality of reference points on the reference area; and
   taking, by the controller, an average value of the distances as the reference distance between the projection device and the reference area.

3. The focal length calibration method of claim 1, further comprising:
   projecting, by the projection lens, a projection image to the projection surface, wherein the projection image is at least partially comprised in the detection area, and the projection image corresponds to at least one of the reference areas.

4. The focal length calibration method of claim 3, wherein:
   by the controller, based on a selection of a user corresponding to at least one of the reference areas, the selected reference areas are used as the at least one first area and the unselected reference areas are used as the at least one second area.

5. The focal length calibration method of claim 1, wherein:

when a majority of the reference distances is greater than at least one of the reference distances, at least one of the reference areas corresponding to the at least one of the reference distances is added to the at least one first area by the controller.

6. The focal length calibration method of claim 1, wherein the projection device further comprises a focus ring and a motor, and the method further comprises:
   obtaining, by the controller, a location point of the focus ring; and
   adjusting, by the controller, a focal length of the projection device by controlling the motor to drive the focus ring based on the reference distances of the at least one second area.

7. The focal length calibration method of claim 6, further comprising:
   stopping, by the controller, the motor from driving the focus ring to adjust the focal length of the projection device in response to determining that at least one of the reference distances is less than a preset distance.

8. The focal length calibration method of claim 7, wherein:
   the controller stops the motor from driving the focus ring to adjust the focal length of the projection device in response to determining that at least one of the reference distances is less than the preset distance for a preset time.

9. The focal length calibration method of claim 1, wherein the projection device further comprises a user input device, and further comprising:
   projecting, by the projection lens, a projection image to the projection surface;
   receiving, by the user input device, a manual focus command;
   displaying, by the projection lens, an on-screen display in the projection image, wherein the on-screen display is related to a focus position of the projection device; and
   performing, by the user input device, the focusing operation of the projection device based on a selected position in response to adjusting the focus position of the on-screen display to the selected position.

10. The focal length calibration method of claim 1, further comprising:
    projecting, by the projection lens, a projection image to the projection surface;
    determining, by the controller, that each of the reference distances is greater than a maximum projection distance of the projection device; and
    displaying, by the projection lens, a prompt message indicating a distance is too large in the projection image.

11. A projection device, comprising:
    a projection lens, projecting a projection image to a projection surface;
    a distance sensor, defining a detection area on the projection surface; and
    a controller, coupled to the projection lens and the distance sensor, wherein the controller is configured to:
       divide the detection area into a plurality of reference areas;
       control the distance sensor to detect a reference distance between the projection device and each of the reference areas;
       find at least one first area and at least one second area in the reference areas, wherein the reference distance of the at least one second area is greater than the reference distance of the at least one first area; and
       perform a focusing operation of the projection lens only based on the reference distance of each of the at least one second areas.

12. The projection device of claim 11, wherein the distance sensor detects a plurality of distances between the projection device and a plurality of reference points on the reference area and takes an average value of the distances as the reference distance between the projection device and the reference area.

13. The projection device of claim 11, wherein the projection image is at least partially comprised in the detection area, the projection image corresponds to at least one of the reference areas, and the controller, based on a selection of a user corresponding to at least one of the reference areas, uses the selected reference areas as the at least one first area and uses the unselected reference areas as the at least one second area.

14. The projection device of claim 11, wherein when a majority of the reference distances is greater than at least one of the reference distances, the controller adds at least one of the reference areas corresponding to at least one of the reference distances to the at least one first area.

15. The projection device of claim 11, wherein the projection device further comprises a focus ring and a motor, the controller obtains a location point of the focus ring from the focus ring, and controls the motor to drive the focus ring to adjust a focal length of the projection device based on the reference distances of the at least one second area.

16. The projection device of claim 15, wherein the controller stops controlling the motor from driving the focus ring to adjust the focal length of the projection device in response to determining that the at least one reference distance is less than a preset distance.

17. The projection device of claim 16, wherein the controller stops controlling the motor from driving the focus ring to adjust the focal length of the projection device in response to determining that at least one of the reference distances is less than the preset distance for a preset time.

18. The projection device of claim 11, wherein the projection device further comprises a user input device, the user input device receives a manual focus command, and the controller displays an on-screen display in the projection image via the projection lens, wherein the on-screen display is related to a focus position of the projection device.

19. The projection device of claim 18, wherein the user input device receives an adjustment command to adjust the focus position of the on-screen display to a selected position, and the controller controls the motor to perform the focusing operation of the projection device based on the selected position.

20. The projection device of claim 11, wherein the controller determines that each of the reference distances is greater than a maximum projection distance of the projection device, and the controller controls the projection lens to display a prompt message indicating a distance is too large in the projection image.

* * * * *